United States Patent
Albert et al.

(10) Patent No.: US 6,284,974 B1
(45) Date of Patent: Sep. 4, 2001

(54) ELECTRICAL WIRING TRUNKING WITH FLEXIBLE HINGE

(75) Inventors: Christophe Albert, Senlis; Dragos Popescu, Rosny-Sous-Bois, both of (FR)

(73) Assignee: Planet Wattohm, Senlis (FR)

( * ) Notice: Subject to any disclaimer, the term of this patent is extended or adjusted under 35 U.S.C. 154(b) by 0 days.

(21) Appl. No.: 09/575,812

(22) Filed: May 22, 2000

(30) Foreign Application Priority Data

Apr. 12, 2000 (FR) ................................................ 00 04711

(51) Int. Cl.⁷ ............................................................. H02G 3/04
(52) U.S. Cl. ............................................ 174/68.3; 52/287.1
(58) Field of Search ..................... 174/68.1, 68.3, 174/72 C, 95, 96, 97, 101; 52/287.1

(56) References Cited

U.S. PATENT DOCUMENTS

| | | | |
|---|---|---|---|
| 4,942,271 | * 7/1990 | Corsi et al. ........................... | 174/101 |
| 5,134,250 | * 7/1992 | Caveney et al. ...................... | 174/101 |
| 5,235,136 | 8/1993 | Santucci et al. ..................... | 174/68.3 |
| 5,274,194 | * 12/1993 | Belcher ................................. | 174/50 |
| 5,435,606 | * 7/1995 | Navazo ................................. | 174/68.3 |
| 5,728,976 | * 3/1998 | Santucci et al. ..................... | 174/135 |
| 5,898,132 | * 4/1999 | Lee ....................................... | 174/101 |
| 6,084,180 | * 7/2000 | DeBartolo, Jr. et al. .............. | 174/95 |

FOREIGN PATENT DOCUMENTS

| | | | |
|---|---|---|---|
| 7800098 | 5/1978 | (DE) | ................................. H02G/3/28 |
| 0809338 | 11/1997 | (EP) | ................................. H02G/3/04 |

* cited by examiner

Primary Examiner—Dean A. Reichard
Assistant Examiner—Adolfo Nino
(74) Attorney, Agent, or Firm—Browdy and Neimark

(57) ABSTRACT

Electrical wiring trunking has a lateral hinge which is reinforced in the closed position. The trunking has a back portion, a cover portion, a hinge defined by a strip, arrangements for stiffening the hinge, closure arrangements and a first internal rib projecting from the inside face of the cover portion on the same side as the closure arrangements.

15 Claims, 2 Drawing Sheets

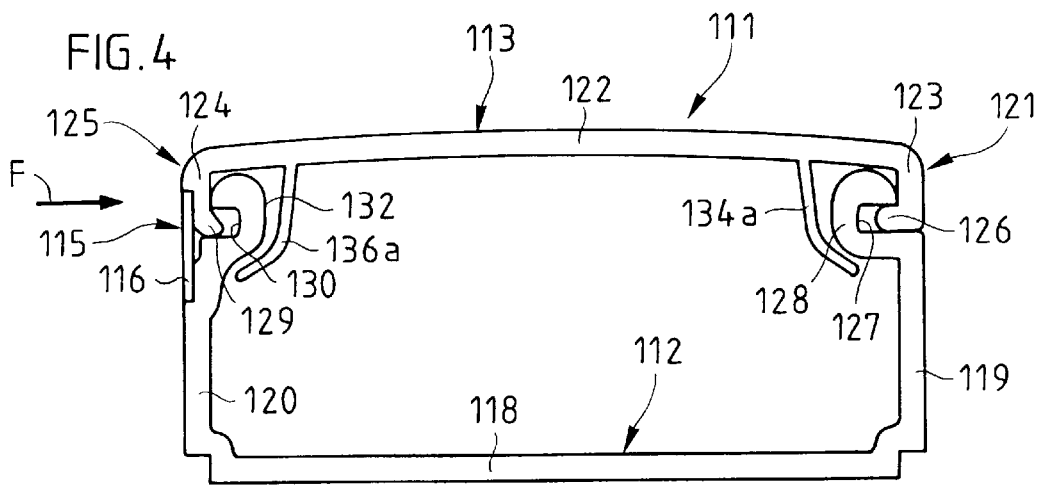
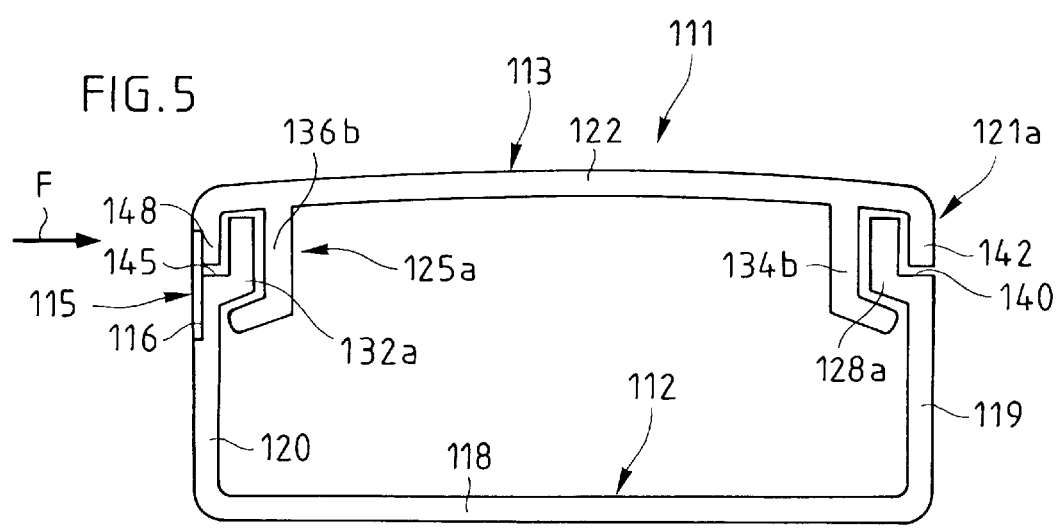

ELECTRICAL WIRING TRUNKING WITH FLEXIBLE HINGE

BACKGROUND OF THE INVENTION

1. Field of the Invention

The invention relates to electrical wiring trunking which has a back portion which preferably has a globally U-shaped profile and a cover portion adapted to be forcibly nested with said back portion, said cover portion being attached laterally to said back portion by a longitudinal hinge.

The invention relates more particularly to an improvement which enhances the locking of the cover portion in the closed position, in particular in the event of a lateral impact.

2. Description of the Prior Art

U.S. Pat. No. 5,235,136 describes wiring trunking in which the hinge is a thinner portion of material extending longitudinally on one side between the bottom portion and the cover portion. The longitudinal edges of the back portion and the cover portion opposite the hinge incorporate forcible nesting means relying on the relative flexibility of the material employed, which is generally a semi-rigid plastics material. However, the hinge area is relatively deformable and the closed trunking may open accidentally in the event of frontal impact to the cover portion or lateral impact to the wall of the back portion that includes the hinge. To solve this problem, the prior art document teaches the provision of a reinforcement inside the back portion and consisting of a longitudinal rib adjoining the wall of the back portion that incorporates the hinge. This complicates the extrusion of the section constituting the trunking and limits the space available for wiring inside the trunking. The invention overcomes these drawbacks.

SUMMARY OF THE INVENTION

The invention provides electrical wiring trunking including a bottom portion which preferably has a globally U-shaped profile and a cover portion shaped to nest forcibly with the back portion, the cover portion being attached laterally to the back portion by a longitudinal hinge defined by a flexible and relatively deformable strip, which trunking includes stiffener means established in the vicinity of the flexible strip by the cooperation of structural members attached to the back portion and the cover portion when the cover portion is closed and forcible nesting closure means between the edges of the back portion and the cover portion opposite those adjoining the hinge, a first internal rib projecting from the inside face of the cover portion taking up a position near the closure means when the cover portion is closed.

The internal rib does not significantly complicate the extrusion of the cover portion. When the cover is closed, it engages in said back portion and locates near the closure means. Consequently, it improves the locking of the forcible nesting of the closure means and improves the resistance to impact, in particular impacts in a direction perpendicular to a side wall of the trunking and substantially at the level of the flexible hinge.

Alternatively, a second internal rib can project from the inside face of the cover portion, to take up a position near the stiffener means when the cover portion is closed. The second rib therefore improves the protection of the hinge, in particular against impacts perpendicular to the longitudinal axis of the trunking and parallel to its back portion.

The stiffener means can include a rib and a groove in the vicinity of the hinge and on respective opposite sides of the longitudinal direction of the strip, one of these two members being attached to the back portion and the other to the cover portion. The rib engages in the groove when the cover portion is closed.

The rib of the stiffener means is preferably part of the cover portion and the groove is preferably part of the back portion. The stiffener means then include an internal longitudinal boss near one edge of said back portion and said second internal rib preferably extends substantially the whole height of the boss. The converse arrangement is possible.

The second internal rib preferably has an upstanding rim engaging under the boss.

The same structure can be adopted for the first internal rib, which can extend substantially the whole height of a boss forming part of the closure means defined above. The first internal rib, attached to the cover portion, can also have an upstanding rim engaging under this boss.

The first internal rib can be part of the closure means themselves. For example, the closure means can include a first longitudinal shoulder external to the edge of the corresponding side wall of said back portion and internally forming the longitudinal boss under which said first rim engages. In this case, the cover portion has a single upstanding lateral edge which bears on the first shoulder when the cover portion is closed.

The means for stiffening the flexible hinge can themselves be simplified if the second internal rib has an upstanding rim engaging under the adjacent boss. In this case, said stiffener means include a second longitudinal shoulder at the edge of the corresponding side wall of said back portion and internally forming the corresponding boss. The cover portion has an upstanding lateral edge which bears on the second shoulder when the cover portion is closed.

The invention will be understood better and other advantages of the invention will become more clearly apparent in the light of the following description of embodiments of electrical wiring trunking according to the invention, which description is given by way of example only and with reference to the accompanying drawings.

BRIEF DESCRIPTION OF THE DRAWINGS

FIG. 4 is a view analogous to FIG. 1 showing another embodiment.

FIG. 5 is a view analogous to FIG. 1 showing another embodiment.

DETAILED DESCRIPTION OF THE PREFERRED EMBODIMENTS

In FIGS. 1 to 5, analogous structural members are identified by the same reference numbers.

Figure 1:
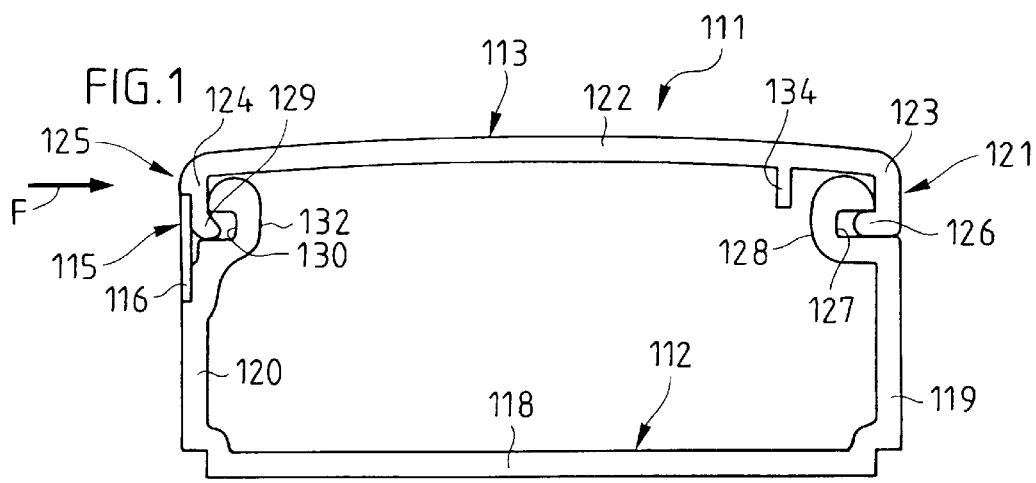
FIG. 1 is a view in cross section of a first embodiment of wiring trunking with the cover portion closed.

Referring more particularly to FIG. 1, the electrical wiring trunking 111 has a back portion 112 with a globally U-shaped profile, a cover portion 113 and a longitudinal hinge 115 defined by a flexible and relatively deformable strip 116 extending laterally between the back portion and the cover portion. These three components are shown in cross section; they are extrusions and consequently have a constant cross section. The description of the trunking as seen in cross section is therefore sufficient to characterize it. The material employed for the back portion and the cover portion is a semi-rigid plastic material that can deform temporarily under load. The trunking and the cover portion are shaped to nest forcibly together.

More particularly, the back portion has a plane wall 118 in the form of a strip forming the base of the trunking and that base is extended by two parallel longitudinal side walls 119, 120 globally perpendicular to the wall 118. The side wall 120 is attached to the cover portion 113 by the hinge 115. The opposite side wall 119 has an edge shaped to cooperate with the cooperating free edge of the cover portion. In other words, forcible nesting closure means 121 are defined between the edges of the back portion and the cover portion opposite those adjoining the hinge 115.

Similarly, stiffener means 125 are provided in the vicinity of the flexible strip 116 through cooperation of respective structural members attached to the back portion and the cover portion.

Thus the cover portion 113 includes a flat strip 122 extended by two longitudinal side walls 123, 124 which are globally perpendicular to the strip 122 and respectively cooperate with the side walls 119, 120 of the back portion.

The side wall 123 has a 90° re-entrant edge 126 adapted to engage in a longitudinal groove 127 in the side wall 119 of the back portion. The longitudinal groove 127 and the re-entrant edge 126 form said forcible nesting closure means 121. Forcible nesting is made possible in particular by the side wall 119 having sufficient flexibility. Because of the longitudinal groove in the side wall 119, the closure means define a first longitudinal internal boss 128 extending along and inside the edge of said back portion.

The flexible strip 116 which constitutes the hinge is made from a material that is much more deformable than the back portion and the cover portion, and even a slightly elastic material, such as an elastomer material.

However, the strip 116 can be extruded at the same time as the back portion and the cover portion using a two-material co-extrusion process known in the art. Thus the trunking 111 can be formed in a single extrusion operation. The stiffener means 125 are defined in the vicinity of the flexible strip by structural members which cooperate when the cover portion is closed. These are a rib 129 and a groove 130 defined along the lengthwise direction of the strip 116 constituting the hinge. In this example, the rib 129 is part of the cover portion and the groove 130 is part of the back portion. When the cover portion is closed, the rib 129 engages in the groove 130 to provide rigid protection around the flexible strip 116. Thus any forces subsequently applied to the trunking are absorbed, without deformation, by the back portion and the cover portion, the hinge being "backed up" by said stiffener means. The rib 129 is a re-entrant edge of the cover portion 113 and the groove 130 is formed along a re-entrant edge of the back portion. The re-entrant edge of the cover portion is at the edge of the side wall 124 to which the hinge is connected and said re-entrant edge of the back portion is at the edge of the side wall 120 of the back portion to which the hinge is connected.

Consequently, the stiffener means form a second internal longitudinal boss 132 which therefore projects longitudinally inside the trunking.

According to an important feature of the invention, a first internal rib 134 projects from the inside face of the cover portion and takes up a position near the closure means 121 defined above when the cover portion is closed. The internal rib 134 improves the locking of the closure means and most importantly improves the resistance to impact in the direction of the arrow F in FIG. 1. As shown in FIG. 4, the first internal rib 134a can extend substantially the whole length of the first boss.

Figure 2:
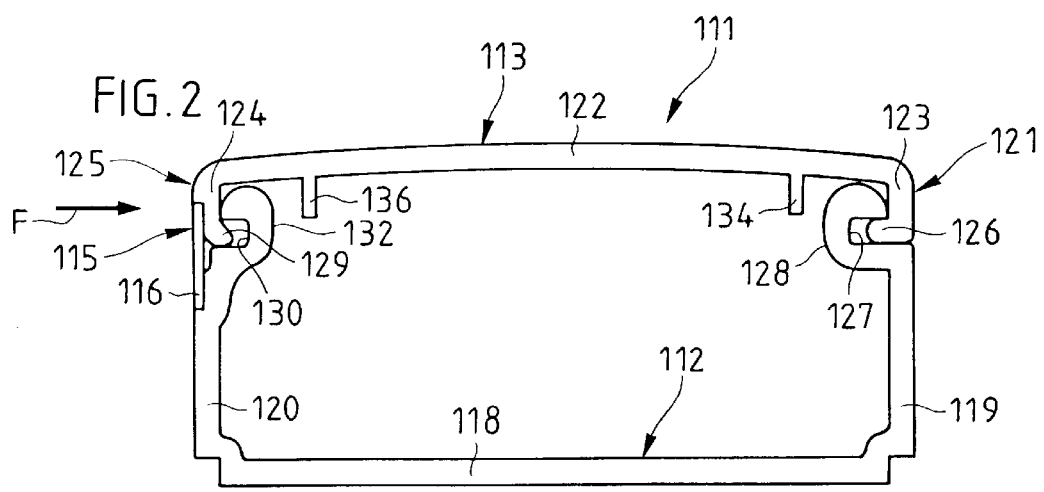
FIG. 2 is a view analogous to that of FIG. 1 showing a different embodiment.

In the embodiment shown in FIG. 2, a second internal rib 136 projects from the inside face of the cover portion and takes up a position near the stiffener means 125 when the cover portion is closed.

Figure 3:
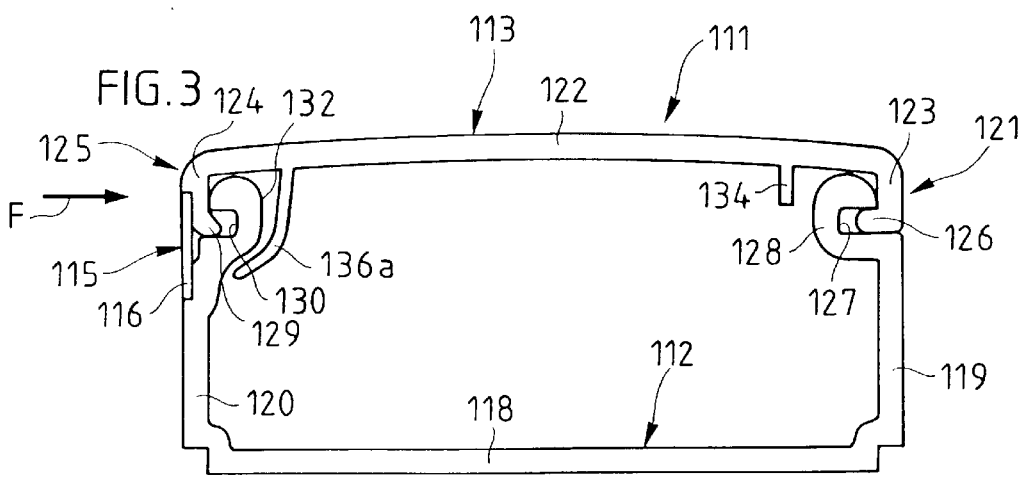
FIG. 3 is a view analogous to that of FIG. 1 showing another embodiment.

In the embodiment shown in FIG. 3, the second internal rib 136a extends substantially the whole height of said second boss. It therefore has an outwardly curved edge engaging under the second boss.

In the embodiment shown in FIG. 4, the first internal rib 134a extends substantially the whole length of the first boss 128 and also has an outwardly curved edge engaging under that boss.

In the embodiment shown in FIG. 5, the closure means 121a and the stiffener means 125a are simplified and in particular the first internal rib 134b is part of the closure means, which include a first longitudinal shoulder 140 (which takes the place of the groove) defined externally at the edge of the corresponding side wall 119 of said back portion. This first longitudinal shoulder internally forms said first longitudinal boss 128a. The cover portion is simplified in this embodiment. It has a single upstanding lateral edge 142 which bears on the first shoulder when the cover portion is closed.

In this embodiment, the first internal rib 134b must have an outwardly curved edge engaging under the first boss 128a because the first rib is part of the closure means.

Likewise, the stiffener means 125a include a second longitudinal external shoulder 145 at the edge of the corresponding side wall 120 of the back portion and internally forming the second boss 132a. In this embodiment the second internal rib 136b has a curved edge engaging under the second boss 132a. The cover portion has on this side also a single upstanding lateral edge 148 which bears on the second shoulder 145 when the cover portion is closed.

Other embodiments are possible. In particular, the hinge 116 can be an adhesive tape applied to the side walls of the back portion and the cover portion. In this case, the back portion and the cover portion are extruded separately and there is no need to use two-material co-extrusion equipment.

What is claimed is:

1. Electrical wiring trunking including a back portion which preferably has a globally U-shaped profile and a cover portion shaped to nest forcibly with said back portion, said cover portion being attached laterally to said back portion by a longitudinal hinge defined by a flexible and relatively deformable strip, and said cover portion having an inside face, the trunking including stiffener means established in the vicinity of said flexible strip by the cooperation of structural members attached to said back portion and said cover portion when said cover portion is closed and closure means between the edges of said back portion and said cover portion opposite those adjoining said hinge, a first internal rib projecting from said inside face of said cover portion taking up a position near said closure means when said cover portion is closed.

2. The trunking claimed in claim 1 further including a second internal rib projecting from said inside face of said cover portion and taking up a position near said stiffener means when said cover portion is closed.

3. The trunking claimed in claim 2 wherein said stiffener means include a second internal longitudinal boss and said second internal rib extends substantially the entire height of said second boss.

3. The trunking claimed in claim 3 wherein said second internal rib has a curved edge engaging under said second boss.

5. The trunking claimed in claim 4 wherein said stiffener means include a rib and a groove defined in the vicinity of said hinge and extending in the longitudinal direction of said flexible strip, one of these two members being attached to said back portion and the other to said cover portion, and said rib is engaged in said groove when said cover portion is closed.

6. The trunking claimed in claim 5 wherein said rib of said stiffener means is part of said cover portion and said groove is part of said back portion.

7. The trunking claimed in claim 6 wherein said back portion has a side wall and said second longitudinal boss is formed by the groove forming part of said stiffener means on said side wall of said back portion.

8. The trunking claimed in claim 4 wherein said back portion has a side wall and said stiffener means include a second longitudinal shoulder at the edge of said side wall of said back portion and internally forming said second boss.

9. The trunking claimed in claim 8 wherein said cover portion has an upstanding lateral edge which bears on said second shoulder when said cover portion is closed.

10. The trunking claimed in claim 1 wherein said closure means include a first internal longitudinal boss and said first internal rib extends substantially the whole length of said first boss.

11. The trunking claimed in claim 10 wherein said first internal rib has a curved edge engaging under said first boss.

12. The trunking claimed in claim 10 wherein said back portion has a side wall and said first longitudinal boss is formed by a groove that is part of said closure means on said side wall of said back portion.

13. The trunking claimed in claim 1 wherein said first internal rib is part of said closure means.

14. The trunking claimed in claim 13 wherein said back portion has a side wall and said closure means include a first longitudinal shoulder at the edge of the corresponding side wall of said back portion and internally forming a first longitudinal boss.

15. The trunking claimed in claim 14 wherein said cover portion has an upstanding lateral edge which bears on said first shoulder when said cover portion is closed.

\* \* \* \* \*